(12) United States Patent
Müller

(10) Patent No.: US 7,661,510 B2
(45) Date of Patent: Feb. 16, 2010

(54) METHOD FOR THE MANUFACTURE OF A LIGHT-WEIGHT SHEET

(76) Inventor: Ulrich Müller, Wassenbergerstr. 44a, Hückelhoven (DE) 41836

( * ) Notice: Subject to any disclaimer, the term of this patent is extended or adjusted under 35 U.S.C. 154(b) by 447 days.

(21) Appl. No.: 11/452,120

(22) Filed: Jun. 13, 2006

(65) Prior Publication Data
US 2006/0289232 A1 Dec. 28, 2006

(30) Foreign Application Priority Data
Jun. 13, 2005 (DE) .............. 10 2005 027 314

(51) Int. Cl.
E04B 1/82 (2006.01)
F01N 1/24 (2006.01)
F02K 1/00 (2006.01)
F02K 1/82 (2006.01)

(52) U.S. Cl. .............. 181/292; 181/213; 181/222; 181/286

(58) Field of Classification Search .............. 181/292, 181/222, 213, 286
See application file for complete search history.

(56) References Cited

U.S. PATENT DOCUMENTS

| | | | | |
|---|---|---|---|---|
| 3,439,774 A | * | 4/1969 | Callaway et al. | 181/222 |
| 5,487,930 A | * | 1/1996 | Lockshaw et al. | 428/53 |
| 5,997,985 A | * | 12/1999 | Clarke et al. | 428/116 |
| 6,135,238 A | * | 10/2000 | Arcas et al. | 181/292 |
| 6,248,423 B1 | * | 6/2001 | Clarke et al. | 428/131 |
| 6,439,340 B1 | * | 8/2002 | Shirvan | 181/213 |
| 2003/0141144 A1 | * | 7/2003 | Wilson | 181/292 |
| 2009/0050404 A1 | * | 2/2009 | Corin | 181/279 |

FOREIGN PATENT DOCUMENTS
DE A-3935120 4/1991

* cited by examiner

Primary Examiner—Jeffrey Donels
Assistant Examiner—Christina Russell
(74) Attorney, Agent, or Firm—Harness, Dickey & Pierce, P.L.C.

(57) ABSTRACT

The invention is directed to a method for manufacturing a sandwich like constructed light weight sheet with sound absorption characteristics, by which an acoustically absorbing cover layer, a substantially grid shape configured first intermediate layer and a bottom layer are bound together, wherein the light weight sheet has a defined surface.

18 Claims, 2 Drawing Sheets

METHOD FOR THE MANUFACTURE OF A LIGHT-WEIGHT SHEET

BACKGROUND OF THE INVENTION

This application claims priority to German patent application 10 2005 027 314.9 filed Jun. 13, 2005 which is hereby incorporated by reference.

Field of the Invention

The present invention relates to a method for the manufacture of a sandwich-like constructed light-weight sheet with sound absorption characteristics, in particular for implementation in gas turbines, for example for the air inlet of jet engines.

Discussion

In order to absorb the sound originating at the air inlet in a jet turbine, so-called acoustic linings have been implemented in the turbine inlet since the 1960's. For this, sandwich constructions are mainly considered, by which a cover layer that faces the air inlet includes a porous structure in order to guide the impinging sound into the structure lying underneath. The flow resistance of the porous cover layer is so constructed that it yields a specific Rayl value, at which an optimal sound absorption occurs. A portion of the sound energy is converted to heat in the porous cover layer and, through this, achieves significant absorption.

It is the object of several known acoustically effective light-weight sheets to achieve this absorption over as wide of a frequency range as possible. U.S. Pat. No. 3,439,774 describes, for example, a light-weight sheet of the named kind, which can absorb sound waves in the lower as well as in the higher frequency range. The sandwich-like constructed light-weight sheet includes a micro-porous cover layer with high permeability, which substantially absorbs sound waves with higher frequency, a micro-porous intermediate layer with lower permeability, which is arranged substantially parallel to the cover layer and absorbs sound waves in the lower frequency range, a substantially impermeable bottom layer, which is arranged beneath and substantially parallel to both the other layers, first spacing means, which is arranged between the cover layer and the first intermediate layer and creates a pre-determined spacing between these two layers, and second spacing means, which is arranged between the first intermediate layer and the bottom layer and creates a pre-determined spacing between these two layers, wherein at least the first or the second spacing means includes a grid-like structure. The sound waves striking the cover layer penetrate the micro-porous cover layer with high permeability, wherein a large portion of the high frequency sound waves are absorbed, while sound waves with lower frequency substantially freely pass through the cover layer. The sound waves maneuver further to the intermediate layer, where sound waves with lower frequency are absorbed, while the high frequency sound waves, which were not absorbed at the initial passage through the cover layer are reflected back in the direction of the cover layer and are absorbed there. Those sound waves with lower frequency, which are not absorbed at the initial passage through the intermediate layer, maneuver further to the substantially impermeable bottom layer, where they are reflected back in the direction of the intermediate layer and are absorbed there. In this manner, a good absorption is created with respect to a broad frequency spectrum.

A further sandwich-like constructed light-weight sheet for implementation in gas turbines is described in DE-A-3935120, for example.

The previously named light-weight sheets are normally manufactured so that the individual layers are joined one below the other. A typical and for a long time implemented joining technique is gluing. In this connection, the individual layers, which frequently consist of different materials, are glued together in their final form. This typically occurs in an autoclave. This type of joining technique, however, leads to debonding of the components from one another in the course of time, especially in the lower areas of the air inlet, in which rain water and moisture can gather, whereby the adhesive connection is degraded through the course of time. This can lead to a failure of the assembly. A further problem arises if the materials, like aluminum and steel, for example, are paired with one another, because a galvanic corrosion arises if these materials stand in contact with one another, which likewise leads to the failure of the assembly or at least to increased maintenance and repair costs.

Finally, U.S. Pat. No. 6,439,340 describes a sandwich-like constructed light-weight sheet for implementation in gas turbines, by which pure metallic materials are used for the individual layers. Herewith are welded together a holed cover layer, a porous and acoustically operative metal fiber mat located directly thereunder, an intermediate layer with honeycomb structure and a bottom layer subsequent thereto, whereby a fundamentally strong connection like with gluing is created. These light-weight sheets achieve the final form in a subsequent forming process. Correspondingly, the previously described problems concerning the glue connection and the galvanic corrosion are resolved with the light-weight sheet suggested in U.S. Pat. No. 6,439,340. On the other hand, large problems arise with the forming, because a very stiff light-weight sheet with the help of a stretch forming mechanism, for example, must be brought into the final form. In this connection, very high stresses arise in the material, which in turn can lead to a possible failure of the assembly, if these stresses relax in the course of time and degrade the weld connection. Such a forming process furthermore also precludes the use of high strength materials, which is the case with titanium for example. A further disadvantage of a light-weight sheet of the above named type is seen in that the acoustically operative layer in the form of a metal fiber mat is positioned and welded between the intermediate layer with honeycomb structure and the upper holed cover layer. As a result of the use of the metal fiber mat, undefined weld connections can result, because the metal fibers do not include consistent material characteristics, which is the case with whole metallic connections. If a metal fiber mat is used as an acoustically operative medium, the mechanical requirements and the acoustical requirements, from the constructional viewpoint, are stringently coupled to one another. If one of the components fails, the complete assembly fails.

SUMMARY OF THE INVENTION

It is the object of the present invention to achieve a method of manufacturing a sandwich-like constructed light-weight sheet with specific acoustic characteristics for sound absorption, as well as a light-weight sheet manufactured with this method, by which the above described disadvantages do not arise.

According to the inventive method for the manufacture of a sandwich-like constructed light-weight sheet with sound absorption characteristics, an acoustic absorbing cover layer, a substantially grid-like constructed first intermediate layer and a bottom layer are bound together. In accordance with the invention, the light-weight sheet achieves a defined surface curvature during the joining of the individual layers. In accordance with the invention, the light-weight sheet receives a defined surface curvature during interlinking of the individual layers. The step of interlinking is thus at least a part of the forming process, which results in the light-weight material receiving its final shape.

Advantageously, an additional perforated intermediate layer is located between the cover layer and the first intermediate layer, and is joined with the cover layer and the first intermediate layer. The total stiffness of the light-weight sheet is increased through the provision of the holed intermediate layer. Because of the fact that the acoustically operative medium forms the uppermost cover layer, it is ensured that the individual weld points between the perforated intermediate layer, the grid-like constructed first intermediate layer and the bottom layer can be accurately welded and also individually checkable, which, for example, is not possible with the use of a metal fiber mat, as is the case in U.S. Pat. No. 6,439,340. The acoustically operative cover layer then plays no role in the strength of the light structural panel. Accordingly, the cover layer can be constructed in an optimal type and manner with respect to its sound absorption characteristics, without having to consider the strength and stiffness of the light structural panel.

Preferably, the connections between the individual layers are created by means of form fit and/or adhesive bonding in accordance with the present invention, like for example through staking, gluing or welding, wherein welding is particularly advantageous.

A particularly smooth expanded metal is used for the implemented cover layer, which includes a substantially defined acoustic flow resistance relative to the normally used metal fiber fleece. The expanded metal is advantageously used in the form of a thin foil, wherein the Rayl value is adjustable through layering of the individual foils on top of each other.

The grid-like constructed intermediate layer, which is used in accordance with method of the present invention, preferably includes individual intersecting metal strips, in which intermittent slits are introduced at the intersection points in an advantageous manner, whereby corresponding connections can be created. The metal strips are preferably manufactured from titanium. Also, an especially smooth titanium expanded metal is preferably considered for the cover layer.

Furthermore, the metal strips of the first intermediate layer can be cut out of a sheet already in its final form, for example by means of laser beam cutting, so that the intermediate layer includes its final form after manufacture of the connections.

Further it is advantageous to exclusively use metallic material for the individual layers in accordance with the present invention, so that all connections between the individual layers can be created through weld points and weld seams. In particular the metal strips are preferably inserted closer to one another at points at which a force transmission is anticipated during the subsequent use of the light weight sheet, in order to compensate for these higher forces. Hence, the metal strips are advantageously provided with holes for weight reduction.

Also, the metal strips are advantageously provided with an intermittent wave pattern on both sides, in order to create a defined weld connection. This preferably occurs if the metal strips are cut from a sheet by means of laser beam cutting.

Finally, the present invention relates to the use of a light weight sheet that is manufactured in accordance with the present invention as an air inlet for jet engines.

BRIEF DESCRIPTION OF THE DRAWINGS

In the following, the present invention will be more precisely described in hand with the accompanying drawings, wherein.

DESCRIPTION OF THE PREFERRED EMBODIMENT

Figure 1:
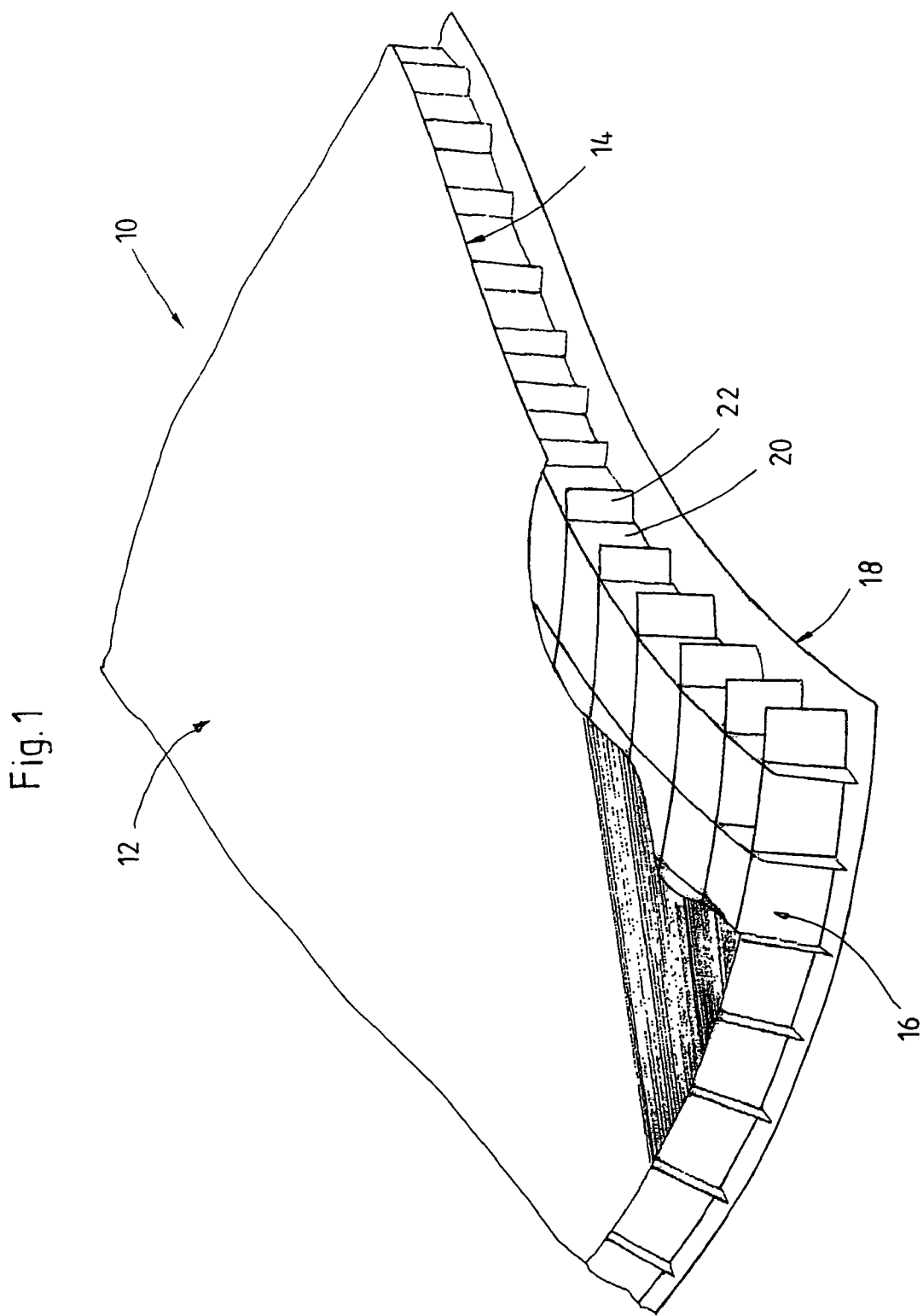
FIG. 1 is a perspective view of a light weight sheet manufactured in accordance with the method of the present invention.

FIG. 1 is a perspective view and shows a section of a light weight sheet 10, which has been manufactured with the method in accordance with the present invention. The light weight sheet 10 includes, as observed in FIG. 1 from top to bottom, an acoustic absorbing cover layer 12, a holed or perforated intermediate layer 14 located thereunder, an essentially grid-like intermediate layer 16 and a bottom layer 18, which all comprise metallic materials and are respectively joined with one another through welded connections. The cover layer 12 includes several particularly smooth titanium expanded metal laminations, which are located atop one another and which respectively include a pre-determined flow resistance. A desired Rayl value can be here precisely adjusted through the one upon the other lying individual laminates, and indeed substantially more precise as than with metal fiber fleece, for example. With the holed intermediate layer 14, it concerns a thin metal sheet, in which passage holes are provided at regular intervals, so that the to be absorbed sound waves can infiltrate into the interior of the light weight sheet 10 through the cover layer 12 and the passage holes of the holed intermediate layer 14. The grid-like intermediate layer 16 predominately comprises titanium metal strips 20 and 22, which are positioned in the longitudinal and transverse direction of the light weight sheet 10, such that a grid formed structure results. The bottom layer 18 comprises a metal sheet.

The top surface of the cover layer 12 of the light weight sheet 10 illustrated in FIG. 1 includes a predetermined surface curvature. This surface curvature is created as the metal strips 20 and 22 forming the grid are cut out of a sheet material, which can occur by means of laser beam cutting, for example. Subsequently, the grid intermediate layer 16 is created from the metal strips 20 and 22. Thereafter, the cover layer 12, the holed intermediate layer 14, the grid intermediate layer 16 and the bottom layer 18 are welded together.

In one embodiment, the strips 20, 22 are cut so that their top and bottom surfaces are curved to define the desired curvature for the final product. As will appear, the strips are assembled together to form the grid-like intermediate layer 16 having the desired curvature for its upper and lower surfaces. The strips are fixed together in this shape, preferably by welding. Then, the holed intermediate layer 14 is welded onto the top surface of the grid intermediate layer 16. The cover layer 12 is then secured to the top surface of the layer 14 again preferably by welding. The bottom layer 18 is similarly secured to the bottom surface of the grid layer 16. Since the layers 12, 14 and 18 are somewhat flexible they follow the curvature of the outer surfaces of the grid 16 when they are welded to it. Alternatively, the layers 12, 14 and 18 can be preformed into a shape complementary to the curved surfaces of the grid 16 to which they are subsequently attached.

Accordingly, no further forming process, like stretching, is required to generate the illustrated form of the light weight sheet 10. In fact, the cover layer 12 and the bottom layer 18 can be in such a way individually formed through a forming process, in so far as it is necessary, that they display on both sides the free form surface of the grid formed intermediate layer. The light weight sheet 10 acquires a defined surface curvature with connection of the individual layers, which corresponds to the existing curvature of the final form of the light weight sheet 10, and consequently can be manufactured as stress free as possible.

Figure 2:
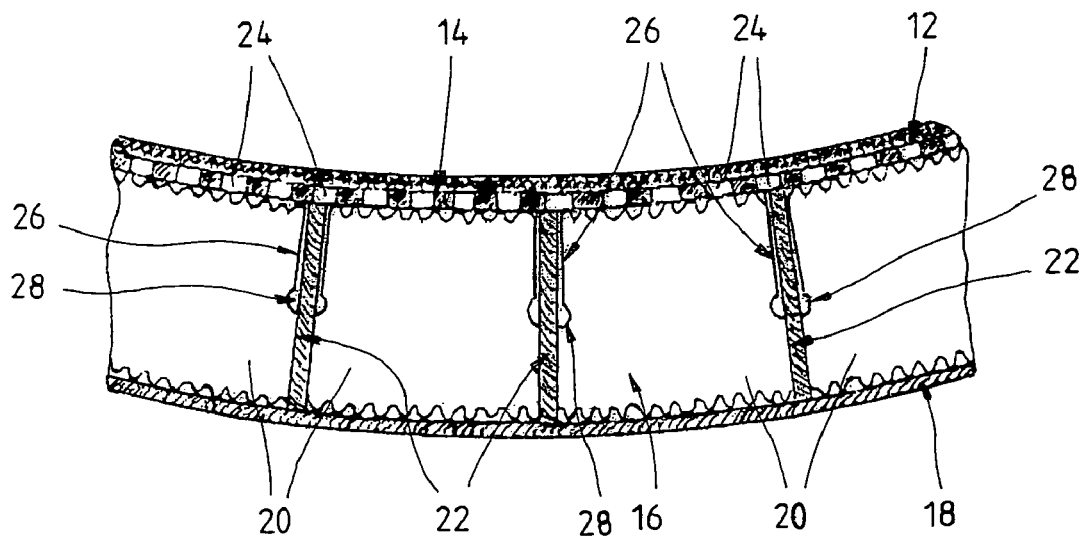
FIG. 2 is a side view of the light weight sheet illustrated in FIG. 1.

FIG. 2 is an enlarged side view of the light weight sheet 10 illustrated in FIG. 1, wherein only a small section of the light weight sheet 10 is shown here. The sandwich-like configured light weight sheet 10 includes, as observed in FIG. 2 from top to bottom, the cover layer 12, the holed intermediate layer 14, the grid intermediate layer 16 and the bottom layer 18, which are welded to each other. The holed intermediate layer 14 includes passage holes 24, which are provided at regular intervals. Slits 26 are provided at each of the intersection points of the metal strips 20 and 22, so that the metal strips 20 and 22 can be inserted into one another. The slits 26 end in circular formed recesses 28, which should prohibit tear formation in the slits 26 (see, e.g., FIG. 3).

The to be absorbed sound waves infiltrate into the light weight sheet 10 from outside through the acoustically operative cover layer 12 and are at least partially absorbed in the cover layer 12. The unabsorbed sound waves travel through the passage holes 24 of the holed intermediate layer 14 into the interior of the structure and are there reflected by surfaces of the metal strips 20 and the bottom layer 18, so that they are again directed back in the direction of the cover layer 12, where an additional absorption can take place.

Figure 3:
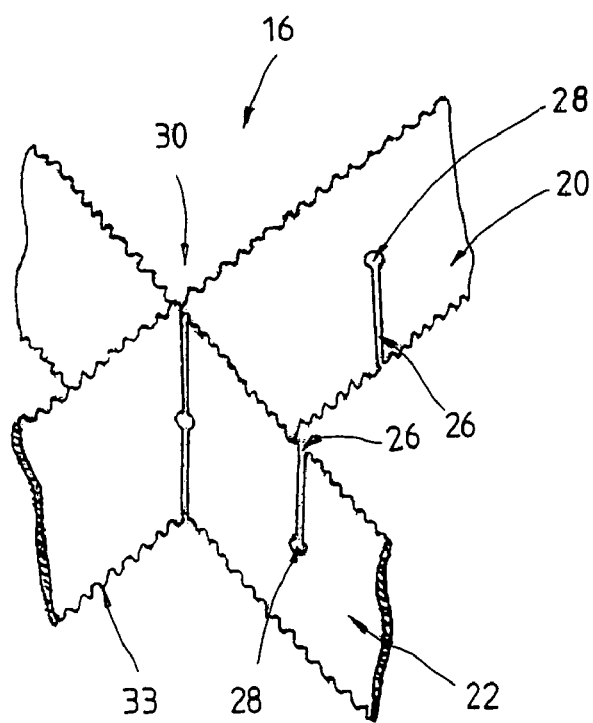
FIG. 3 is a perspective view of a grid-like constructed intermediate layer, which is used with a light weight sheet illustrated in FIGS. 1 and 2.

FIG. 3 is a perspective view of two metal strips 20 and 22 of the grid formed intermediate layer 16, wherein the metal strips 20 and 22 are arranged substantially orthogonal to one another. The metal strips 20 and 22 each include slits 26, which end in circular formed recesses 28. Each of the slits 26 of the two metal strips 20 and 22 are inserted into one another at an intersection point 30 of the two metal strips 20 and 22, whereby an insertion connection is created. Both metal strips 20 and 22 are provided on upper and lower end surfaces with serrated or an intermittent wave pattern 33 to facilitate a good weld connection. This preferably occurs if the metal strips are cut out of a sheet by means of laser beam cutting.

It should be clear that the exemplary embodiments illustrated in the FIGS. 1 through 3 of the light weight sheet 10 manufactured in accordance with the method of the present invention is not limiting. In fact, modifications and alterations are possible without leaving the scope of protection of the present invention, which is defined through the accompanying claims.

What is claimed is:

1. A method for the manufacture of a sandwich like constructed light weight sheet with sound absorption characteristics, with which an acoustic absorbing cover layer, a substantially grid shaped configured first intermediate layer and a bottom layer are bound with one another,
    characterized in that, the light weight sheet acquires a defined surface curvature through binding of the individual layers, whereby the implemented cover layer includes a particularly smooth expanded metal, whereby the expanded metal is implemented in the form of at least one metal laminate, whereby the Rayl value of the cover layer is adjustable through the number of the laminates implemented for the cover layer.

2. A method in accordance with claim 1, by which an additional holed intermediate layer is located between the cover layer and the first intermediate layer, and is bound with the cover layer and the first intermediate layer.

3. A method in accordance with claim 1, by which the binding occurs by means of form fitting and/or adhesive bonding.

4. A method in accordance with claim 1, by which metallic material is exclusively used for the individual layers.

5. The method of claim 1 wherein the light weight sheet is mounted to an air inlet for a jet engine.

6. A method in accordance with claim 1, by which intermittent slits are introduced in individual metal strips of the implemented first intermediate layer at intersection points.

7. A method in accordance with claim 6, by which the metal strips of the implemented first intermediate layer are titanium strips.

8. A method in accordance with claim 7, by which the metal strips are cut from a sheet already in their final form.

9. A method in accordance with claim 8, by which the cutting out of the metal strips occurs by means of laser beam cutting.

10. A method in accordance with claim 9, by which the metal strips are more closely inserted into one another.

11. A method in accordance with claim 9, by which the metal strips are provided with holes for weight reduction.

12. A method in accordance with claim 9, by which the metal strips are provided with intermittent wave patterns on both sides.

13. A method in accordance with claim 6, by which the cover layer is a smooth titanium expanded metal.

14. A method for the manufacture of a sandwich-like sheet having sound absorption characteristics, the method comprising:
    laser cutting individual intersecting metal strips;
    binding an acoustic absorbing cover layer, a substantially grid-shaped first intermediate layer having the individual intersecting metal strips, and a bottom layer to form the sheet such that the binding causes the sheet to acquire a defined surface curvature; and adjusting a Rayl value of the cover layer by varying a number of laminates employed for the cover layer.

15. A method in accordance with claim 14 wherein the binding an acoustic absorbing cover layer, a substantially grid-shaped first intermediate layer having the individual intersecting metal strips, and a bottom layer to form the sheet such that the binding causes the sheet to acquire a defined surface curvature comprises binding an acoustic absorbing cover layer, a substantially grid-shaped first intermediate layer having the individual intersecting metal strips, a second intermediate layer, and a bottom layer to form the sheet such that the binding causes the sheet to acquire a defined surface curvature, the second intermediate layer being bound to the acoustic absorbing cover layer and the first intermediate layer.

16. A method in accordance with claim 14, by which the binding occurs by means of form fitting.

17. A method in accordance with claim 14, by which the binding occurs by means of adhesive bonding.

18. A method in accordance with claim 14, further comprising:
    introducing intermittent slits in the individual metal strips of the implemented first intermediate layer at intersection points.

\* \* \* \* \*